INVENTORS.
Emil Rabelow
Harry William Bauer, Jr.
Paul Regis Saxon

THEIR ATTORNEYS

Dec. 13, 1966 E. RABELOW ET AL 3,291,358

STAPLE MAGAZINE

Filed April 7, 1965 4 Sheets-Sheet 2

INVENTORS.
Emil Rabelow
Harry William Bauer, Jr.
Paul Regis Saxon
BY
THEIR ATTORNEYS Dec. 13, 1966　　　　　E. RABELOW ET AL　　　　　3,291,358
STAPLE MAGAZINE Filed April 7, 1965　　　　　　　　　　　　　　　4 Sheets-Sheet 3

INVENTORS.
Emil Rabelow
Harry William Bauer, Jr.
Paul Regis Saxon
BY
*[signature]*
THEIR ATTORNEYS Dec. 13, 1966   E. RABELOW ET AL   3,291,358

STAPLE MAGAZINE

Filed April 7, 1965   4 Sheets-Sheet 4

INVENTORS.
Emil Rabelow
Harry William Bauer, Jr.
Paul Regis Saxon
BY
*Woodcock Burden Robinson & Webb*
THEIR ATTORNEYS 3,291,358
STAPLE MAGAZINE
Emil Rabelow and Harry William Bauer, Jr., Butler, and Paul Regis Saxon, Gibsonia, Pa., assignors to International Staple & Machine Company, Butler, Pa., a corporation of Pennsylvania
Filed Apr. 7, 1965, Ser. No. 446,244
6 Claims. (Cl. 227—126)

This application relates to a staple magazine, and more particularly, to a staple magazine for use in a portable stapling machine. More specifically, the staple magazine is for holding and feeding staples of the type shown in U.S. Patent No. 2,703,402. The individual staples disclosed in that patent are secured side to side to each other to form sticks of staples, as is conventional, but the staples have legs which form an angle of only approximately 15 degrees with the axis of the crown of the staple. Sticks of such staples can be nested or stacked one above the other, thereby saving a large amount of storage space, as compared to sticks of staples in which the legs are bent at approximately 90 degrees to the crown of the staple.

Prior to our invention staples have been held in portable stapling machines in long magazines projecting rearwardly from the staple driving mechanism. Such magazines conventionally have held about two sticks of 50 staples each or 100 staples in all. Special long magazines which will hold about 200 staples have also been used, but they make a portable stapling machine extremely awkward to handle.

Staples of the type shown in U.S. Patent No. 2,703,402 having legs which are bent at an angle of approximately 15 degrees with the axis of the crown of the staples are used in staplers such as that shown in Heilman U.S. Patent No. 2,987,725 which have a staple driving throat through which staples are driven into a workpiece and a forming block immediately in advance of the driving throat on which the legs of the staples are bent so that they form an angle of approximately 90 degrees with the axis of the crown of the staple prior to being moved into the driving throat and driven into a workpiece. A combined staple driving and forming blade mechanism moves in the head of the stapler and on each stroke drives a formed staple into a workpiece and forms the next succeeding staple. All of this is shown in said Patent No. 2,987,725. However, that patent shows a staple magazine which is generally similar to the elongated magazines conventionally used in stapling machines, except that the magazine has a track shaped to accommodate the "flat" staples of the type shown in U.S. Patent No. 2,703,402.

We have invented a staple magazine in which sticks of "flat" staples are stacked against each other and in which a relatively large number of staples can be stored in a portable stapling machine in a relatively small space. Thus, in our magazine we are able to store approximately 1000 staples in a magazine which is no longer than the conventional magazines in which only 100 staples could be stored. Our magazine is particularly useful for portable stapling machines which are pneumatically driven and which can drive a large number of staples in a relatively short period of time.

It has heretofore been proposed to provide a portable pneumatically driven stapler with a large number of staples by storing the staples in the machines in coils. However, in such arrangements the staples are fed to the driving throat by pulling a tape which holds the staples together, which feed method is not reliable and causes jams. In our magazine there is a positive pressure feeding the staples to the driving throat of a stapler. Also, in the roll-type of magazine, the magazine can be reloaded only when it is completely empty. Our magazine can be loaded at any time, thus providing flexibility of operation and avoiding inconvenient time delays which may be caused by the fact that the roll-type magazines can be reloaded only after they are fully empty.

In the accompanying drawings we have illustrated certain presently preferred embodiments of our invention in which FIGURE 1 is a side view of a stapler equipped with our magazine;

Figure 1:
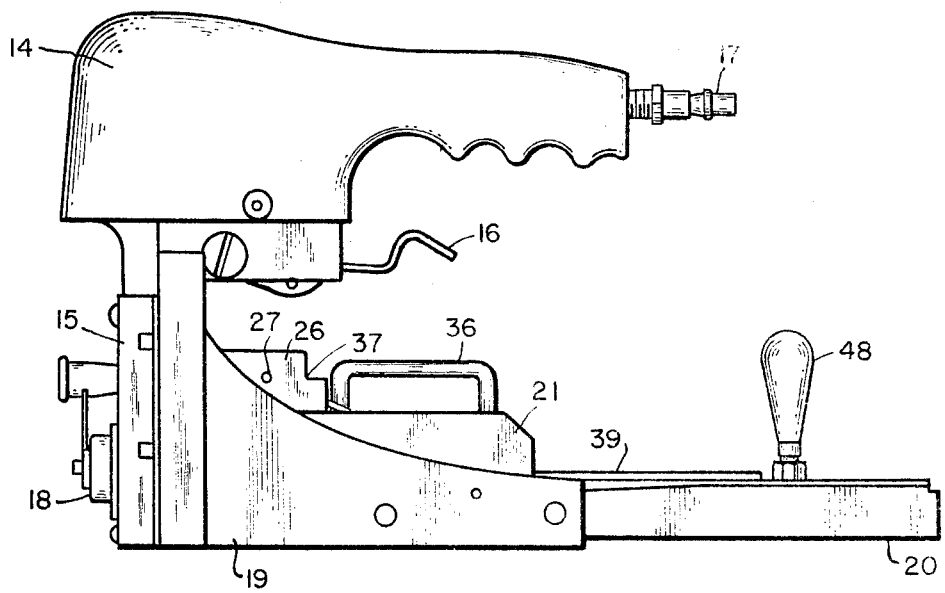

FIGURE 1 of the drawings shows a portable pneumatically driven stapling machine equipped with our magazine. The stapler has a head 14 within which air cylinders, valves, etc., are installed to drive a combination staple driving and forming mechanism downwardly (viewing FIGURE 1) through a driving throat (not shown) in a stapler post 15. The air cylinders, valves, pistons, etc., in the driving head 14 are actuated by a manually operated trigger 16, and the head 14 has a connection 17 for a supply of compressed air to actuate the stapler.

The stapler may be of the type shown in Heilman U.S. Patent No. 2,987,725 which is equipped with retractable anvils which, as explained in that patent, pierce the workpiece and provide surfaces for bending over the legs of staples on the side of the workpiece opposite to that from which the staples are driven. The stapler may also have mechanism indicated generally by the reference number 18 for adjusting the depth of penetration of the anvils.

A plate 19 extends rearwardly from each side of the stapler post 15 and a base 19a (see FIGURES 2 and 3) extends between the plates to provide a support for holding a staple magazine.

Figure 3:
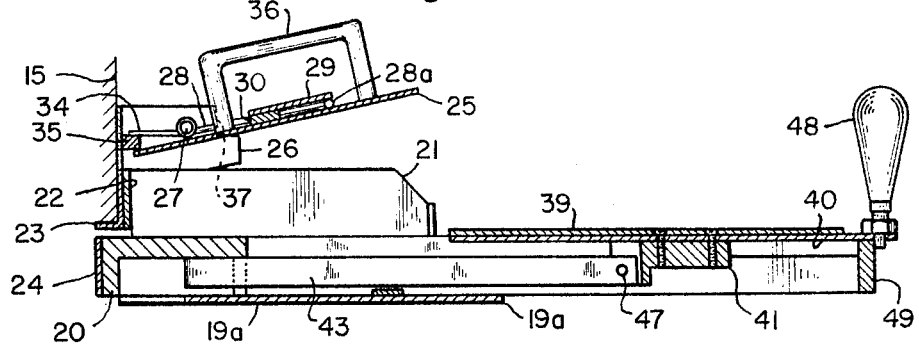
FIGURE 3 is a longitudinal section of our magazine showing the parts in loading position.
Figure 4:
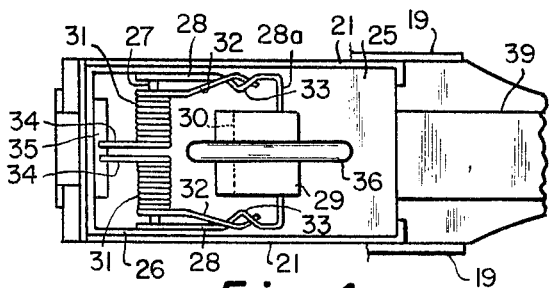
FIGURE 4 is a partial plan view of FIGURE 2.
Figure 5:
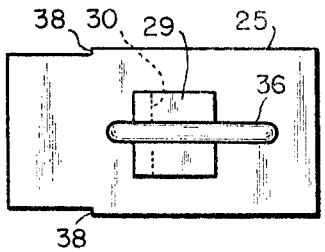
FIGURE 5 is a plan view of part of the mechanism used to hold staples in the magazine.
Figure 6:
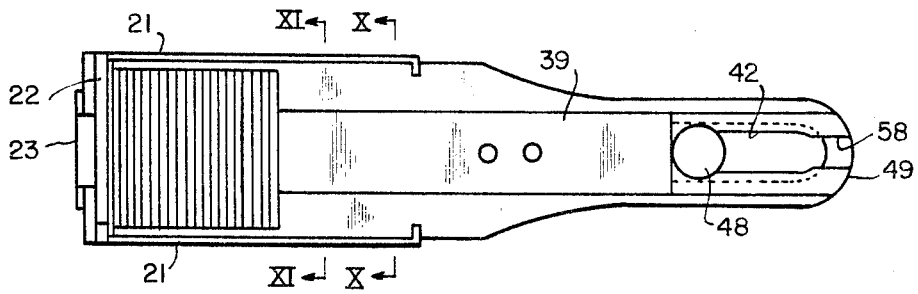
FIGURE 6 is a plan view of our magazine with the mechanism for holding the staples in the magazine removed.
Figure 7:
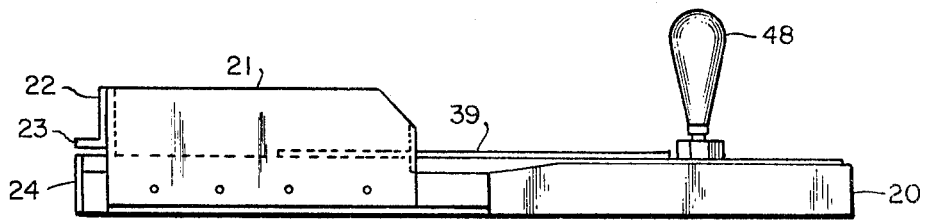
FIGURE 7 is a side view of the structure shown in FIGURE 6.
Figure 8:
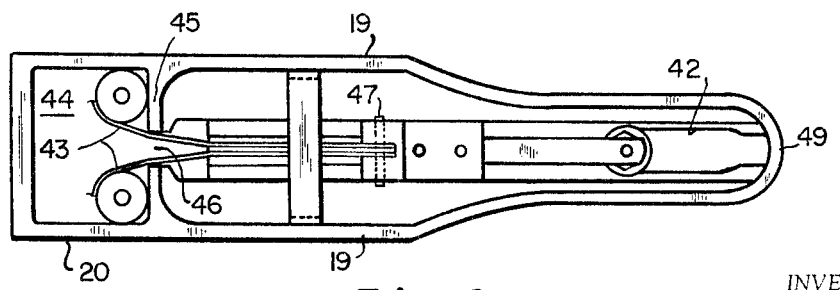
FIGURE 8 is a bottom view of the structure shown in FIGURE 6.
Figure 9:
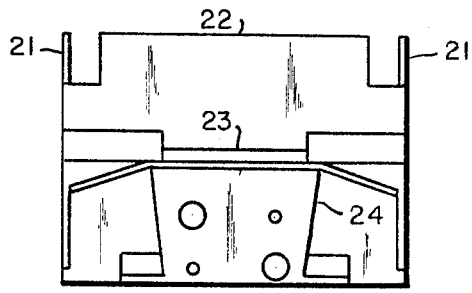
FIGURE 9 is a front view of the structure shown in FIGURE 6.

Referring to FIGURES 3 and 8, our magazine includes a housing 20 which fits between the plates 19 and extends into the post 15 of the stapler to feed staples into the stapler driving throat. Two plates 21 extend upwardly from the sides of the housing at the end of the magazine which is nearest the driving throat when the magazine is in position in the stapler. A plate 22 extends across the ends of the plates 21 adjacent the driving throat of the stapler and carries a stripper foot 23 which holds down unformed staples while the legs are being bent to approximately 90 degrees with the axis of the crowns of the staples.

Figure 10:
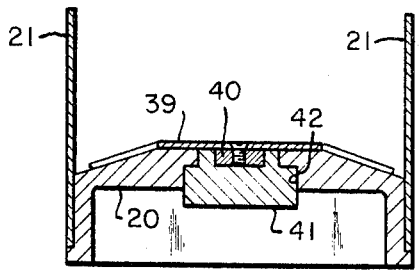
FIGURE 10 is a section along the line X—X of FIGURE 6.
Figure 11:
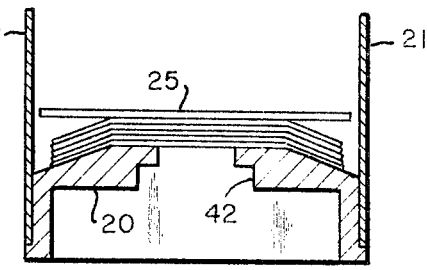
FIGURE 11 is a section along the lines XI—XI of FIGURE 6.

The plates 21 and 22 form a magazine in which sticks of staples are stacked one upon the other. The housing 20 forms a bottom for the magazine and a support for the staples. Referring to FIGURES 10 and 11, it will be seen that the top of the housing is shaped to conform to the staples before they are formed in the stapler, that is, the legs of the staples form an angle of approximately 15 degrees with the axis of the crowns of the staples. The forward end of the housing, that is, the end of the housing closest to the driving throat of the stapler, carries a forming plate 24 about which the legs of the staples are bent.

A plurality of sticks of staples is placed within the magazine formed by the plates 21 and 22 with the bottom stick resting upon the top surface of the housing 20 as shown in FIGURE 11. The sticks of staples are held on the housing 20 by a hold-down plate or cover 25 which is swingingly mounted on the post 15 of the stapler so that it can be moved from the position shown in FIGURE 2 in which it is resiliently pressed by a spring against the top stick of a stack of staples in the magazine or in the position shown in FIGURE 3 in which it is held spaced from the top of the housing 20 so that sticks of staples can be loaded into the magazine.

FIGURES 2 to 5 show our arrangement for mounting the plate 25. A U-shaped bracket 26 extends rearwardly from the post 15 of the stapler and carries a shaft 27 on which the ends of the legs of a U-shaped wire 28 are pivotally mounted. The base 28a of the U-shaped wire 28 slides under a second plate 29 mounted on the plate 25 by a strip 30 and extending parallel to but spaced from the plate 25.

Two helical torsion springs 31 are mounted on the shaft 27, and each has a straight extension 32 having a hook at its outer end which engages an inwardly offset portion 33 formed in each leg of the U-shaped wire 28. The other ends of the torsion springs 31 have straight extensions 34 which rest upon a ledge 35 extending inwardly from the bracket 26. Thereby a downward force is exerted by the springs 31 on the plate 25 to press it downwardly against a stack of staple sticks within the staple magazine.

Figure 2:
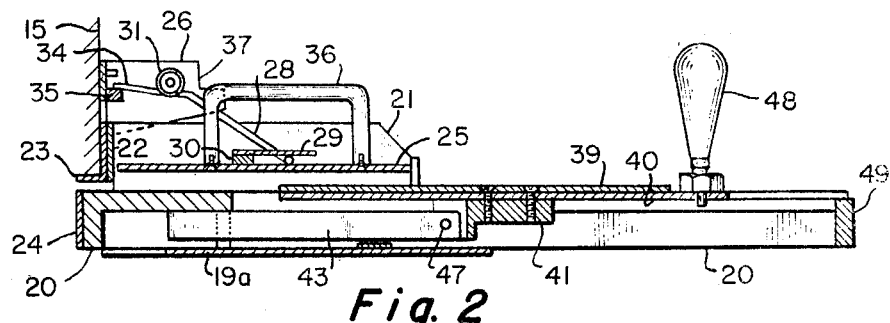
FIGURE 2 is a longitudinal section of our magazine showing the parts in operating position.

The plate 25 has a handle 36 for manually moving the plate from the position shown in FIGURE 2 to that shown in FIGURE 3.

As shown in FIGURE 2, the sides of the bracket 26 are notched to form shoulders 37 and the end of the plate 25 which is nearest the bracket 26 is reduced in width so as to form shoulders 38 (see FIGURE 5) which are spaced from each other a distance such that, when the plate is in the position shown in FIGURE 3, the shoulders 38 on the plate will engage the shoulders 37 on the bracket 26. The length of the reduced end portion of the plate 25 is such that when the shoulders 37 and 38 are in engagement, the end of the plate will extend under the ledge 35 extending inwardly from the bracket 26. The springs 31 tend to rock the plate 25 clockwise (viewing FIGURE 3) on the shoulders 37 and 38 and this rocking is stopped by engagement of the end of the plate 25 with the ledge 35. Thereby the plate 25 is held in the position shown in FIGURE 3.

To move the plate 25 from the position shown in FIGURE 2 to the position shown in FIGURE 3 the handle 36 is grasped and the plate 25 is pulled outwardly away from the forward end of the magazine and swung on the wire 28 around the bracket 26 and then moved forwardly so that the shoulders 37 and 38 will engage and so that the inner end of the plate is beneath the ledge 35. Because of the mounting of the plate 25 on the base 28a of the U-shaped wire 28 by means of the plate 29 the plate 25 can be moved inwardly and outwardly with respect to the base 28a of the wire 28.

An important function of our magazine, of course, is to feed staples to the forming plate 24 and then into the driving throat of the stapler. This function is accomplished by mechanism shown in FIGURES 6 to 12 inclusive. An elongated pusher plate 39 is pressed to move across the top of the housing 20 (see FIGURE 10) to engage the stick of staples which is in contact with the top of the housing and move the stick towards the throat of the stapler. As the stick in contact with the housing moves towards the driving throat of the stapler, the plate slides beneath the stick of staples next to the moving stick and thereby supports the stack of staples in the magazine. After the stick in contact with the housing 20 has been consumed, the plate 39 is withdrawn outwardly away from the throat until it is in the position shown in FIGURE 3 to permit the next stick of staples to rest on the top of the housing 20 and be engaged by the forward end of the plate.

The plate 39 is mounted on a bar 40 and the plate and the bar are bolted to a block 41. The block 41 slides in a slot 42 which extends longitudinally in the housing 20 (see FIGURES 8, 10 and 11) and thereby the plate is guided in its movement towards and away from the staple driving throat. Two constant force non-cumulative force springs 43 of the type manufactured by the Hunter Spring Company under the mark "Neg'ator" are positioned within a hollow rectangle 44 formed in the bottom of the forward end of the housing 20 by the sides and forward end of the housing and a partition 45 (see FIGURE 8) and pass through an opening 46 in the partition 45 to the forward end of the block 41 and are secured to the block by a pin 47. These springs 43 exert a constant force on the block 41 and thereby the plate 39 tending to move the plate 39 forwardly against the stick of staples in contact with the top of the housing 20 and move that stick towards the driving throat of the stapler.

The outer end of the bar 40 carries a handle 48 whereby the plate 39 can be withdrawn away from the driving throat of the stapler and against the force of the springs 43 when a stick of staples in contact with the top of the housing 20 has been fed into the driving throat of the stapler and a fresh stick of staples is needed in front of the plate 39.

The handle 48 also has a latch mechanism whereby it can be held in withdrawn position as shown in FIGURE 3 for loading sticks of staples into the magazine formed by the plates 21 and 22. As appears in FIGURES 2, 3 and 6, the outer end of the slot 42 is closed by an end wall 49 of the housing which extends across the slot 42 and joins the two sides of the housing which form the side walls of the slot. The latch mechanism carried in the handle 48 cooperates with the end wall 49 to hold the plate 39 in its outer position for loading of the magazine.

Figure 12:
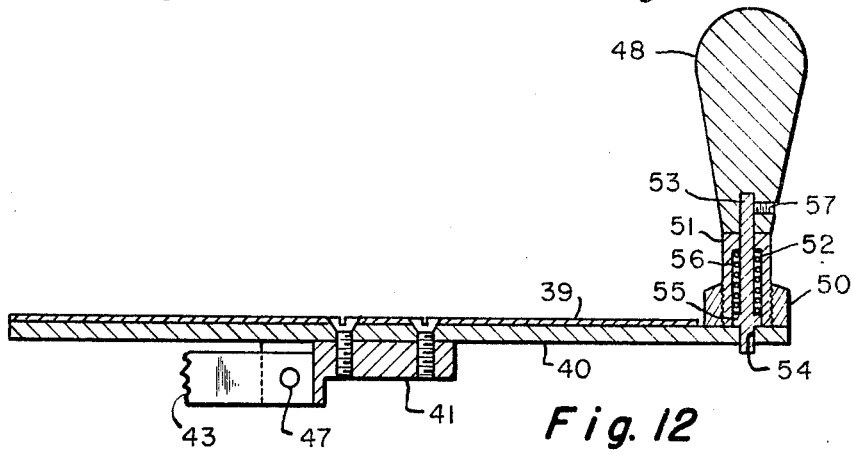
FIGURE 12 is a partial longitudinal section of a staple pusher which forms part of our magazine.
Figure 13:
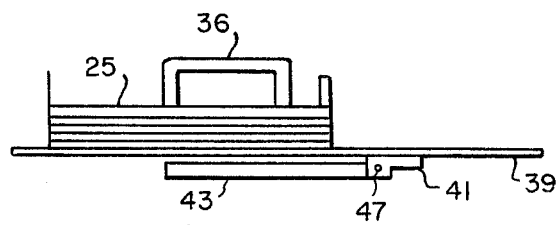
FIGURE 13 is a schematic drawing illustrating the operation of our magazine.

The latch mechanism is shown in FIGURE 12 and comprises a boss 50 secured to the outer end of the bar 40 which is internally threaded to receive an externally threaded cylinder 51 which has an axially extending recess 52 in which a pin 53 slides. The pin 53 extends through an opening 54 in the bar 40 and has an enlarged portion 55 which engages the top surface of the bar 40. A compression spring 56 within the recess 52 extends between the enlarged portion 55 of the pin and the inner end of the recess 52 and tends to force the pin 53 out of the recess 52, bringing the enlarged portion 55 against the top of the bar 40. A set screw 57 holds the handle 48 on the pin 53 so that when the handle is raised (viewing FIGURE 12) the pin 53 is raised out of the opening 54 in the bar 40.

To hold the plate 39 in the position shown in FIGURE 3, the plate is withdrawn rearwardly by pulling on the handle 48 and raising the handle so that the pin 53 clears the end wall 49. The handle is then lowered to put the pin back of the end wall. To release the plate 39 the handle 48 is lifted, thus lifting the pin 53 and clearing the end wall 49. The handle is held in the raised position until the pin 53 has passed the end wall 49 whereupon the handle can be released, allowing the pin to drop into the slot 42. A groove 58 in the end wall 49 of the housing provides clearance for the bar 40 when the handle 48 is moved outwardly past the end wall 49 to hold the plate 39 in its outer position.

Figure 14:
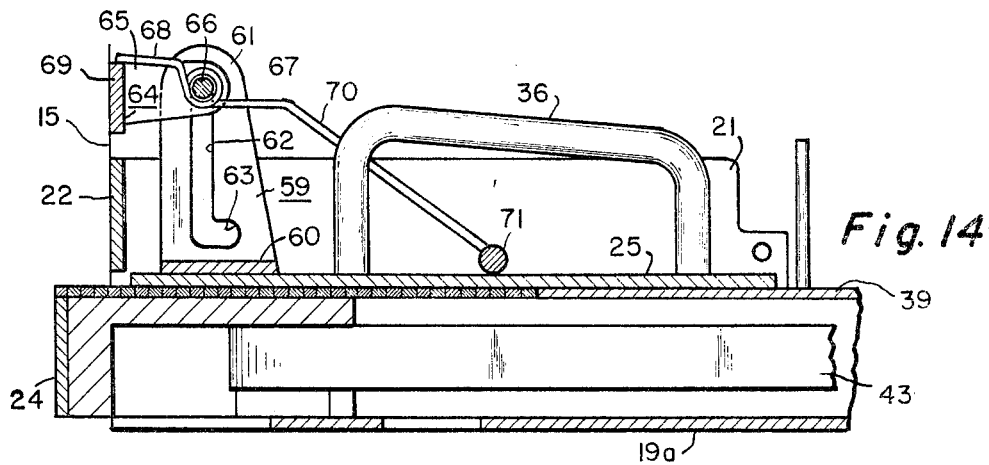
FIGURE 14 is a partial longitudinal section of a modified form of our magazine showing the parts in operating position.
Figure 15:
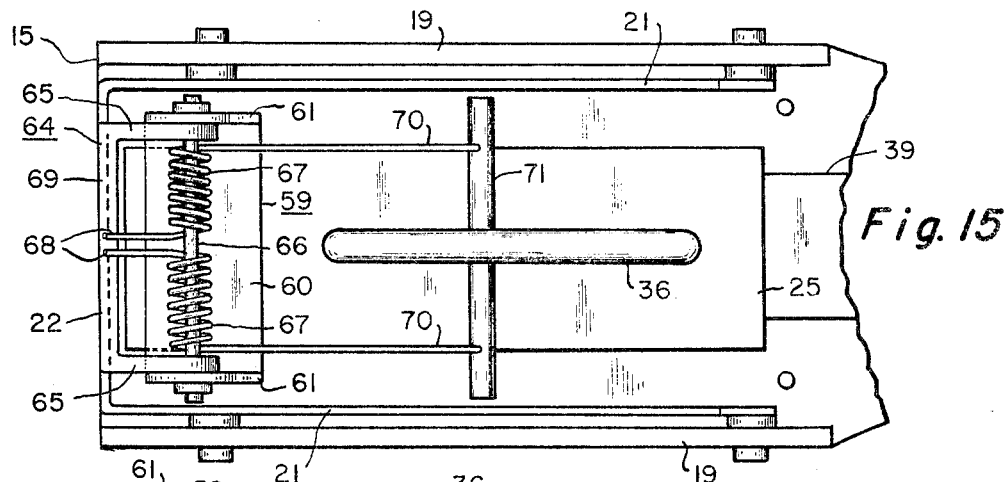
FIGURE 15 is a partial plan view of the magazine shown in FIGURE 14.
Figure 16:
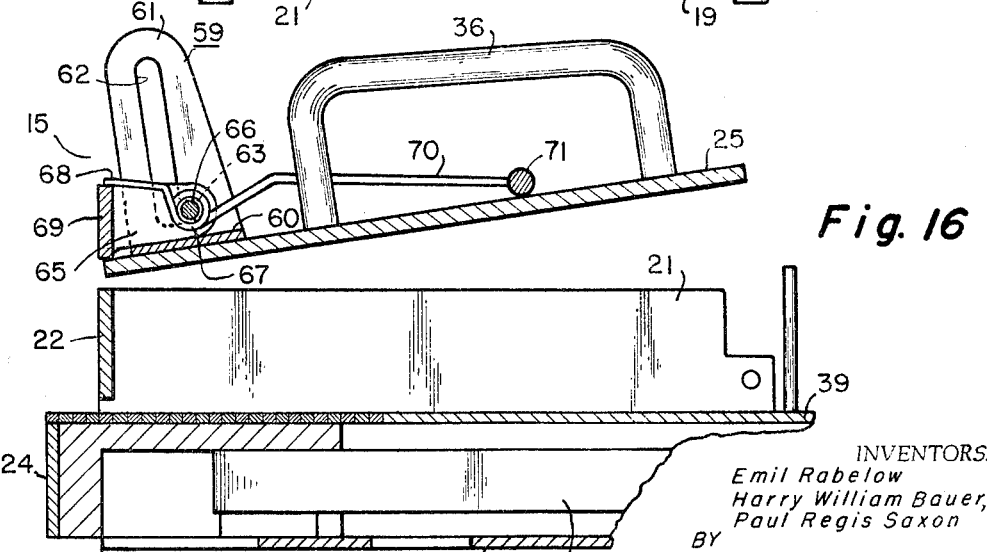
FIGURE 16 is a partial longitudinal section of the modified form of our magazine showing the parts in loading position.

FIGURES 14 to 16 inclusive show a modified form of staple magazine which differs from the magazine described above primarily in the structure for mounting the staple hold-down plate 25.

Referring to these figures, the hold-down plate 25 has adjacent its end nearest the staple driving throat a U-shaped bracket 59, the base 60 of which is spot-welded to the top face of the plate 25. The legs 61 of the bracket are parallel to each other and extend at right angles to the face of the plate 25. Each leg has an elongated slot 62 which extends from a point adjacent the outer end of the leg to a point adjacent the base 60. At the end of the slot adjacent the base of the bracket there is an offset slot portion 63 which extends parallel to the base 60 and away from the stapler post 15.

Another U-shaped bracket 64 is mounted on the stapler post and its legs 65 extend outwardly from the post and their center lines parallel to the staple track. A shaft 66 extends through the outer ends of the legs 65 of the bracket 64 and through the slots 62 in the legs 61 of the bracket 59. As shown in FIGURE 15, the width of the brackets 59 and 64 is such that their respective legs are side by side on the shaft 66.

Two helical torsion springs 67 are positioned on the shaft 66 between the legs of the bracket 64. They each have extensions 68 which engage the top of the base 69 of the bracket 64 and at their opposite ends extensions 70 which at their outer ends carry a rod 71 which extends across the plate 25. As shown in FIGURE 14, the extensions 70 extend rearwardly from the shaft 66 and are then bent downwardly so that the springs can resiliently press the plate 25 against staples on the staple track if there is only a single stick of staples on the staple track.

FIGURE 16 shows the plate 25 in the staple loading position in which the plate is held away from the staple track so that sticks of staples can be stacked up on the track. To move the plate from the position shown in FIGURE 14 to that shown in FIGURE 16, an operator grasps the handle 36 and raises the plate 25 until the shaft 66 reaches the end of the slots 62 near the base of the bracket 59. The operator then pushes the plate 25 towards the stapler post 15, during which movement the shaft 66 slides into the offsets 63 in the slots 62. At the same time that the operator pushes the plate 25 towards the stapler post 15, he tilts the plate 25 counterclockwise (viewing FIGURE 16), so that the end of the plate 25 nearest the stapler post 15 goes under the base 69 of the bracket 64. The force of the springs 67 tends to turn the plate 25 clockwise (viewing FIGURE 16) about the shaft 66 and to press the end of the plate 25 against the bottom of the base 69 of the bracket 64, thereby releasably holding the plate 25 in the staple loading position shown in FIGURE 16.

While we have described certain presently preferred embodiments of our invention, it is to be understood that they may be otherwise embodied within the scope of the appended claims.

We claim:

1. In a staple magazine having a staple track on which sticks of staples are stacked on each other in a direction at right angles to the track, a holder for said staples comprising,
 (A) a plate,
 (B) means for swingingly mounting said plate for movement to a first position against the stick of staples in a stack furthest from said track and to a second position away from said track to permit loading of stacked sticks of staples on said track, and
 (C) means for resiliently pressing said plate against the stacked sticks of staples when the plate is in said first position and for releasably holding said plate in said second position.

2. A staple holder as described in claim 1 in which the means for mounting the plate comprises a U-shaped wire pivotally mounted at the outer ends of the legs of the U-shape and means for slidably securing the base of the U-shape to the plate.

3. A staple holder as described in claim 1 in which the means for resiliently pressing said plate against the stacked sticks of staples comprises a helical torsion spring having a straight extension at one end engaging said plate mounting means and means for restraining rotation of said spring about its longitudinal axis.

4. In a staple magazine having a staple track on which sticks of staples are stacked on each other in a direction at right angles to the track, a holder for said staples comprising,
 (A) a plate,
 (B) a U-shaped bracket having sides extending parallel to the sides of the plate,
 (C) a U-shaped wire pivotally mounted at the ends of the legs of the U on said bracket, the base of said wire being slidably mounted on said plate,
 (D) a helical torsion spring mounted on said bracket and having a straight extension at one end engaging one of the legs of said U-shaped wire and a straight extension at the other end engaging said bracket whereby said spring resiliently presses said plate against sticks of staples stacked on said track,
 (E) shoulders positioned opposite to each other on the sides of said bracket, and
 (F) shoulders on the sides of said plate, spaced from each other to fit on the shoulders of said base, and spaced from an end of said plate,
 (G) interengagement between the shoulders on the plate and on the bracket and engagement of one end of the plate with the bracket holding the plate under pressure from said spring in spaced position from said track for loading of stacked sticks of staples on said track.

5. In a staple magazine having a staple track on which sticks of staples are stacked on each other in a direction at right angles to the track, a holder for said staples comprising,
 (A) a plate,
 (B) two legs extending from the opposite sides of the plate adjacent one end of the plate and at right angles to one side of the plate,
 (C) pivot means spaced from said track for said legs,
 (D) said legs being slidably mounted on said pivot means whereby the plate may be moved to a first position against a stack of staples on the track and to a second position away from said track to permit loading of stacks of staple sticks on to the track, and
 (E) a spring engaging said plate at a point spaced from said legs to resiliently press said plate against a stack of staple sticks when in the first position and to releasably hold said plate when in the second position.

6. In a staple magazine having a staple track on which sticks of staples are stacked on each other in a direction at right angles to the track, a holder for said staples comprising,
 (A) a plate,
 (B) a U-shaped bracket having two legs spaced from but extending parallel to said staple track,
 (C) a second U-shaped bracket,
  (1) the base of the second bracket being secured to said plate,
  (2) the legs of said bracket having an elongated slot extending from a point adjacent the outer ends of the legs to a point adjacent the base of the bracket, said slot having an offset portion extending from the end of the slot adjacent the base in a direction away from the first bracket and parallel to the base, (D) a shaft extending through the slot in the second bracket and mounted in the ends of the legs of the first bracket, whereby the plate is swingingly mounted on the shaft and movable into two positions, in the first of which the plate presses against the outer sticks of staples stacked on said track and in the second of which the shaft is in said offset position of the slot and the end of the plate is beneath said first bracket, and (E) a helical torsion spring mounted on said shaft between said brackets and having an extension at one end which presses against said plate and at the other end an extension which presses against said first bracket, whereby in said first position of the plate, the plate resiliently presses the stacked sticks of staples against said track and in the second position the plate is held away from said track.

References Cited by the Examiner

UNITED STATES PATENTS

| | | | |
|---|---|---|---|
| 2,112,941 | 4/1938 | Weber et al. | 227—126 X |
| 2,482,156 | 9/1949 | Crosby et al. | 227—126 |
| 2,522,931 | 9/1950 | Curtiss | 227—126 |
| 2,865,022 | 12/1958 | Forrester | 227—120 |
| 2,931,038 | 4/1960 | Wandel | 227—83 |
| 2,987,725 | 6/1961 | Heilman | 227—108 X |
| 2,994,878 | 8/1961 | Abrahamsen. | |
| 3,026,518 | 3/1962 | Oussani. | |

GRANVILLE Y. CUSTER, JR., *Primary Examiner.*